US009643125B2

(12) United States Patent
Reddy et al.

(10) Patent No.: US 9,643,125 B2
(45) Date of Patent: May 9, 2017

(54) EMISSIONS REDUCTION FOR $CO_2$ CAPTURE

(71) Applicant: FLUOR TECHNOLOGIES CORPORATION, Aliso Viejo, CA (US)

(72) Inventors: Satish Reddy, Laguna Beach, CA (US); Joseph Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 154 days.

(21) Appl. No.: 13/851,010

(22) Filed: Mar. 26, 2013

(65) Prior Publication Data

US 2013/0251600 A1    Sep. 26, 2013

Related U.S. Application Data

(60) Provisional application No. 61/615,428, filed on Mar. 26, 2012.

(51) Int. Cl.
*B01D 53/62* (2006.01)
*B01D 53/79* (2006.01)
(Continued)

(52) U.S. Cl.
CPC ......... *B01D 53/79* (2013.01); *B01D 53/1475* (2013.01); *B01D 53/32* (2013.01);
(Continued)

(58) Field of Classification Search
CPC .... B01D 53/62; B01D 53/32; B01D 53/1475; B01D 2259/818; B01D 2258/0283;
(Continued)

(56) References Cited

U.S. PATENT DOCUMENTS

| 5,318,758 A | 6/1994 | Fujii et al. |
| 5,746,984 A | 5/1998 | Hoard |

(Continued)

FOREIGN PATENT DOCUMENTS

| CN | 201635805 | 11/2010 |
| CN | 102225303 | 10/2011 |

(Continued)

OTHER PUBLICATIONS

Chen, Z. et al, "Nonthermal Plasma for Gaseous Pollution Control", Industrial & Engineering Chemistry Research, 2002, vol. 41, No. 9, pp. 2082-2089.

(Continued)

*Primary Examiner* — Xiuyu Tai
(74) *Attorney, Agent, or Firm* — Conley Rose, P.C.; Kristin Jordan Harkins

(57) ABSTRACT

Systems and processes for reducing carbon capture emissions are described. The process involves introducing a radical species into a decarbonized combustion gas. The radical species react with residual amines or unwanted compounds in the decarbonized combustion gas, thus reducing the concentration of residual amines or unwanted compounds in the exhaust gas. The system includes a carbon capture absorber with non-thermal plasma generator configured to provide radical species reducing the concentration of residual amines or unwanted compounds in the exhaust combustion gas.

20 Claims, 3 Drawing Sheets

(51) Int. Cl.
  *B01D 53/14* (2006.01)
  *B01D 53/32* (2006.01)
  *B01D 53/54* (2006.01)
  *B01D 53/58* (2006.01)
  *B01D 53/72* (2006.01)

(52) U.S. Cl.
  CPC ........... *B01D 53/323* (2013.01); *B01D 53/54* (2013.01); *B01D 53/58* (2013.01); *B01D 53/62* (2013.01); *B01D 53/72* (2013.01); *B01D 2252/102* (2013.01); *B01D 2252/204* (2013.01); *B01D 2252/2021* (2013.01); *B01D 2252/20405* (2013.01); *B01D 2252/20447* (2013.01); *B01D 2252/20484* (2013.01); *B01D 2252/20489* (2013.01); *B01D 2257/504* (2013.01); *B01D 2258/0283* (2013.01); *B01D 2259/818* (2013.01); *Y02C 10/04* (2013.01); *Y02C 10/06* (2013.01)

(58) Field of Classification Search
  CPC ........ B01D 53/79; B01D 53/72; B01D 53/54; B01D 53/58; B01D 53/323; B01D 2252/204; B01D 2252/102; B01D 2252/2021; B01D 2252/20405; B01D 2252/20447; Y02C 10/04; Y02C 10/06
  See application file for complete search history.

(56) References Cited

U.S. PATENT DOCUMENTS

| | | | |
|---|---|---|---|
| 6,066,303 A | 5/2000 | Sudduth et al. | |
| 6,089,169 A * | 7/2000 | Comiskey | C10J 3/18 110/185 |
| 6,132,692 A | 10/2000 | Alix et al. | |
| 6,136,158 A | 10/2000 | Wang et al. | |
| 6,348,178 B1 | 2/2002 | Sudduth et al. | |
| 6,605,263 B2 | 8/2003 | Alix et al. | |
| 7,316,737 B2 | 1/2008 | Mimura et al. | |
| 7,713,421 B2 | 5/2010 | Galbraith | |
| 7,767,167 B2 | 8/2010 | Keras | |
| 2002/0014071 A1 * | 2/2002 | Balmer et al. ................. 60/273 | |
| 2003/0077212 A1 | 4/2003 | Hammer | |
| 2008/0289495 A1 | 11/2008 | Eisenberger et al. | |
| 2009/0282977 A1 | 11/2009 | Koss | |
| 2009/0324443 A1 | 12/2009 | Whitehead et al. | |
| 2010/0200390 A1 | 8/2010 | Ikeda et al. | |
| 2010/0254868 A1 | 10/2010 | Obee et al. | |
| 2011/0064634 A1 | 3/2011 | Enos | |

FOREIGN PATENT DOCUMENTS

| | | |
|---|---|---|
| CN | 202061136 | 12/2011 |
| EP | 1125704 | 10/2011 |
| JP | 2006247547 A | 9/2006 |
| JP | 201510871 | 4/2010 |
| KR | 2003-0043404 | 6/2003 |
| WO | 2009/091437 | 7/2009 |
| WO | 2011/123301 | 10/2011 |

OTHER PUBLICATIONS

US Environmental Protection Agency, "Using Non-Thermal Plasma to Control Air Pollutants", prepared by the Clean Air Technology Center, Feb. 2005.

Patent Cooperation Treaty, KIPO, "Notification of Trasnmiattal of the International Search Report and the Written Opinion of the International Searching Authority, or the Declaration", PCT Application No. PCT/US13/33932, issued Jul. 2, 2013.

EP13769954, Extended European Search Report, mailed Nov. 19, 2015, 9 pages.

* cited by examiner

EMISSIONS REDUCTION FOR $CO_2$ CAPTURE

This application claims priority to U.S. Provisional Patent Application Ser. No. 61/615,428 filed on Mar. 26, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is emissions reduction for carbon dioxide ($CO_2$) capture processes.

BACKGROUND

The following description includes information that may be useful in understanding the present invention. It is not an admission that any of the information provided herein is prior art or relevant to the presently claimed invention, or that any publication specifically or implicitly referenced is prior art.

Carbon dioxide ($CO_2$) capture processes and technologies are commonly used in fossil fuel-burning plants. The purpose of $CO_2$ capture is to minimize $CO_2$ emissions by capturing/removing $CO_2$ from combustion gas and storing the $CO_2$ for safe disposal or use.

Unfortunately, some $CO_2$ capture technologies produce other unwanted emissions, such as, monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, and amine degradation products. It has recently been appreciated that some $CO_2$ capture technologies are releasing these unwanted emissions in potentially harmful amounts, it would be advantageous to provide new $CO_2$ capture technologies, systems, and processes that minimize these harmful emissions.

Non-thermal plasma (NTP) technology (also referred to as dielectric barrier discharge, dielectric barrier corona discharge, silent discharge plasma, high energy corona, electron beam plasma corona destruction, electro-catalytic oxidation, and capillary discharge) is currently being studied and developed for removing pollutants from atmospheric emissions, See "*Using Non-Thermal Plasma to Control Air Pollutants*," by the United States Environmental Protection Agency, February 2005, EPA-456/R-05-001. Simply stated, NTP processes generally comprise introducing a gas into an electrical field that is sufficiently strong to cause molecules in the gas to form highly reactive free radicals (e.g., $O_2$ changes to $O^+$ and $O^+$). The free radicals then react with pollutants to facilitate removal of the pollutants. For example, NTP technology can be used to convert elemental mercury to mercury oxide in order to facilitate mercury removal from combustion gas. It would be advantageous to provide a NIP process capable of reducing harmful emissions created by $CO_2$ capture processes.

Japanese Patent Application Publication JP2010510871T describes a method of reducing volatile organic compounds (VOCs) emissions and halogenated volatile organic compounds (HVOCs) emissions using reactive oxygen species (ROS) produced from a dielectric barrier discharge (DBD) electrode and a non-thermal plasma field. Korean Patent Application Publication KR102003004340 also describes a method of reducing VOC emissions from a combustion gas using NIP technology. Other patent references that apply NIP technology to VOC removal are U.S. Pat. No. 7,767,167 and International Patent Publication No. WO2011/123301.

It has yet to be appreciated that NIP technologies can be used to reduce unwanted emissions produced from $CO_2$ capture processes (e.g., amines, etc).

SUMMARY OF THE INVENTION

The inventive subject matter provides apparatus, systems, and methods in which unwanted compounds produced from carbon capture processes are reduced. In one aspect of some embodiments, a system includes a carbon capture absorber having an inlet and an outlet that define a combustion gas pathway. A combustion gas having high amounts of carbon dioxide flows throw the absorber along the pathway. The absorber has an injector configured to inject an amine solvent into the pathway at a first injection point. The amine solvent mixes and reacts with the combustion gas and produces a rich amine solvent and a decarbonized combustion gas. The decarbonized gas contains unwanted compounds, such as monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, or any amine degradation product. A plasma generator is placed inside the absorber and downstream of the injector. The plasma generator treats the decarbonized combustion gas to produce a plurality of radical species that react with the unwanted compounds, thus reducing the concentration of the unwanted compounds in the exhaust gas (i.e., the gas released into the atmosphere).

In one aspect of some embodiments, the plasma generator comprises a non-thermal plasma generator. In other aspects of some embodiments, the absorber includes a plurality of injectors for injecting the amine solvent. The plasma generator is placed downstream of all the solvent injectors, however, it is also contemplated that some of the injectors could be located downstream of the plasma generator.

In yet other aspects, the unwanted compounds have a concentration of more than fifty parts-per-million just upstream of the plasma generator, and a concentration less than or equal to 1 part-per-million just downstream of the plasma generator. The decrease of concentration is due to destruction of the unwanted compounds and not due to dilution. In other embodiments, the plasma generator is configured to reduce an upstream concentration of about six parts-per-million to a downstream concentration of one part-per-million, more preferably, a half a part-per-million.

In another aspect of some embodiments, the plasma generator is configured to produce very little back pressure (i.e., the pressure difference between just upstream and just downstream of the plasma generator), preferably less than 10 millibars, more preferably less than 5 millibars, more preferably less than 2 millibars. In some embodiments, the plasma generator includes plates that are placed parallel to the decarbonized combustion gas pathway.

In yet another aspect of some embodiments, the plasma generator is a thermal plasma generator. In these embodiments, the power supplied to the thermal plasma generator is preferably adjusted such that substantially no $NO_x$ is produced.

The inventive subject matter also provides systems for reducing unwanted emissions from a carbon capture process, wherein the plasma generator is external to the carbon capture absorber. The carbon capture absorber includes a second injector system for injecting radical species supplied by the plasma generator. In some embodiments, the plasma generator utilizes atmospheric air to provide radical species. The thermal plasma generator is preferably located close to the absorber so that the radical species lifetime inside the absorber is maximized.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including methods and devices for reducing harmful and/or unwanted emissions from carbon capture processes.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
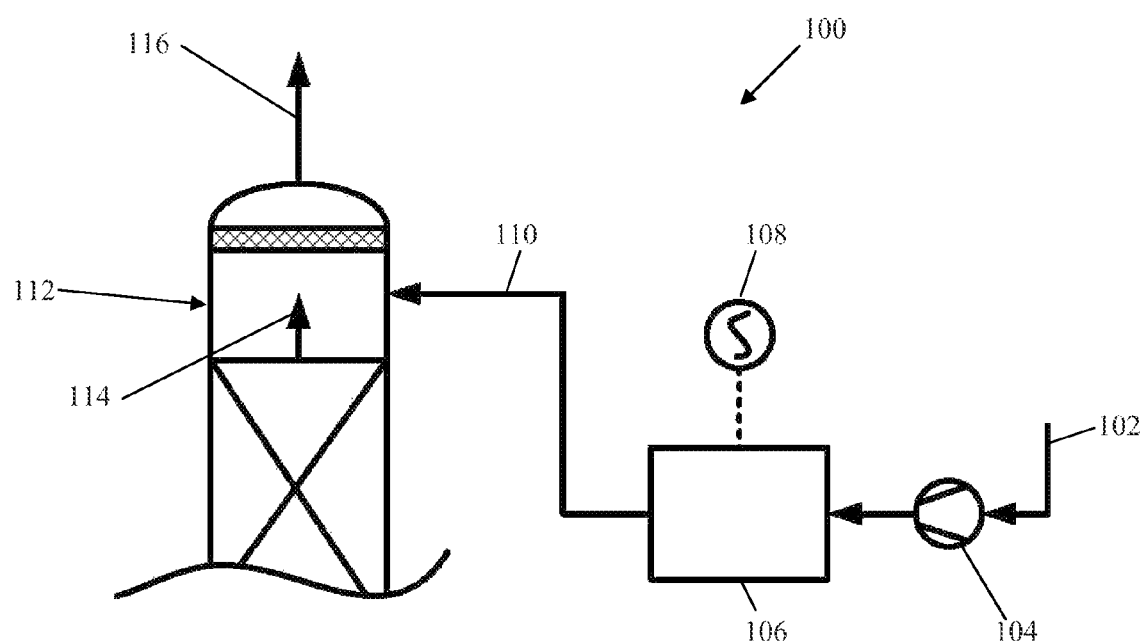
FIG. 1 is a schematic of one embodiment of a system for reducing unwanted carbon capture emissions.

FIG. 1 shows a system 100 for reducing carbon capture emissions. Atmospheric air 102 is drawn into blower 104 and pushed into non-thermal plasma (NIP) generator 106. Power source 108 produces an electrical field within NTP generator 106. As atmospheric air 102 passes through the electrical field, molecules become excited and form high-energy, ionized gas molecules including oxygen, hydroxyl, and peroxyl radicals. High-energy ionized gas 110 is sent to absorber 112 and mixes with decarbonized combustion gas 114 before gas 114 is vented to the atmosphere. Gas 110 contains molecules with the ability to oxidize, react with, and/or combust impurities in decarbonized combustion gas 114. These impurities may include residual amines or other unwanted compounds produced from a carbon capture process (e.g., monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, and amine degradation products). The combustion gas 114 is then vented to the atmosphere as exhaust gas 116.

System 100 advantageously reduces unwanted emissions produced from carbon capture processes. For example, exhaust gas 116 has a concentration of residual amines or other unwanted compounds that is substantially lower than the concentration in decarbonized combustion gas 114. This reduction in the concentration of residual amines or other unwanted compounds is due to the destruction of the compounds and not due to dilution.

Figure 2:
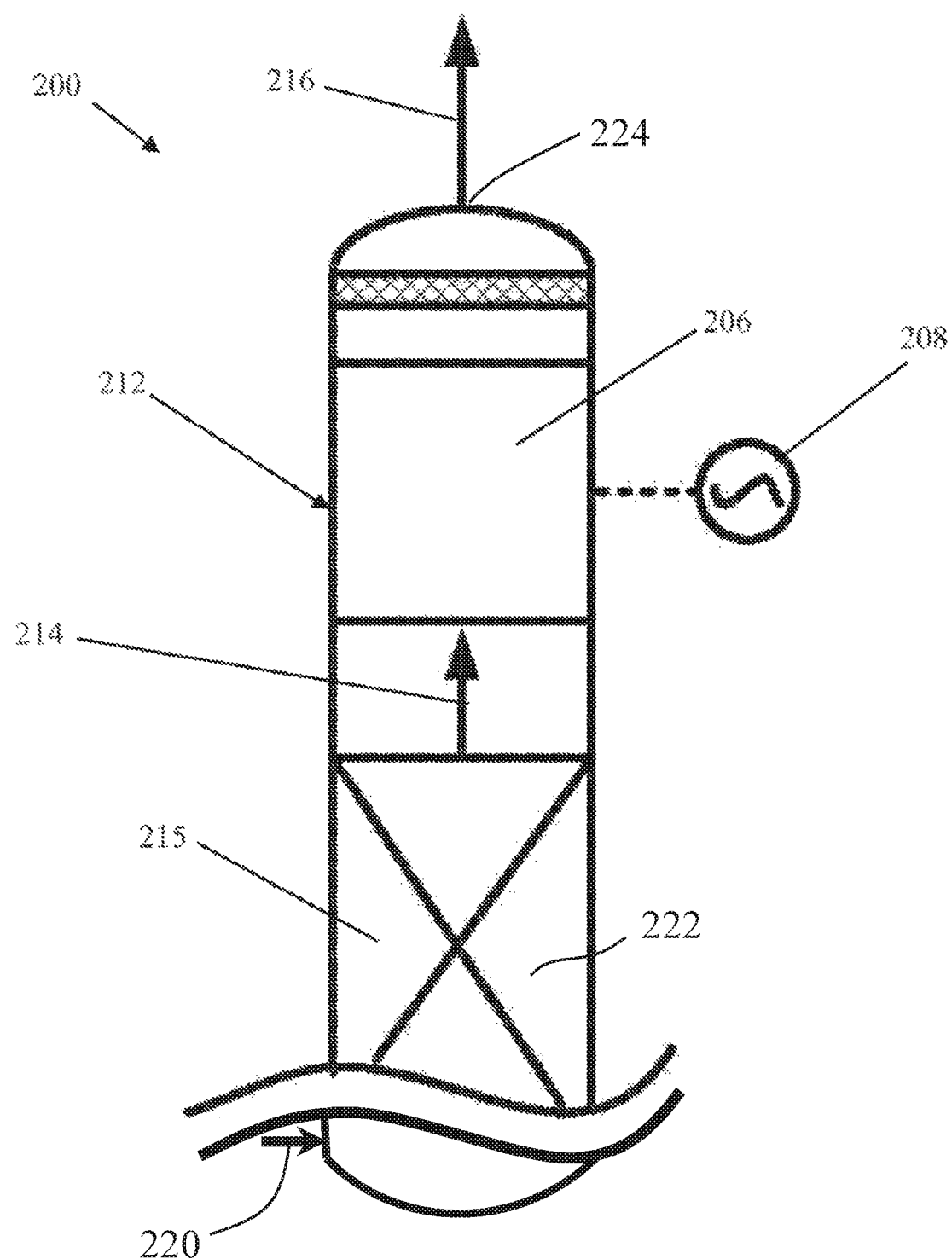
FIG. 2 is another embodiment of a system for reducing unwanted carbon capture emissions.

FIG. 2 shows a system 200 for reducing carbon capture emissions. Absorber 212 receives a combustion gas at an inlet 220 just upstream of carbon capture process 215. Carbon capture processes are well known and generally comprise injecting an amine solvent 222 into the flow pathway of a combustion gas. Water-washing the decarbonized gas is also well known to those familiar with the art and may be included in process 15. Process 215 produces decarbonized combustion gas 214 and a rich amine solvent (not shown). Gas 214 contains residual amines or other unwanted compounds (e.g., amines that were not used during the carbon capture process or amine degradation products). Gas 214 then flows through NTP generator 212. Power source 208 produces an electrical field within NIP generator 206, producing a high-energize ionized gas within generator 206. Radical species formed within generator 212 react with residual amines or unwanted compounds to reduce the concentration of residual amines or unwanted compounds in exhaust gas 216 passing through outlet 224.

Figure 3:
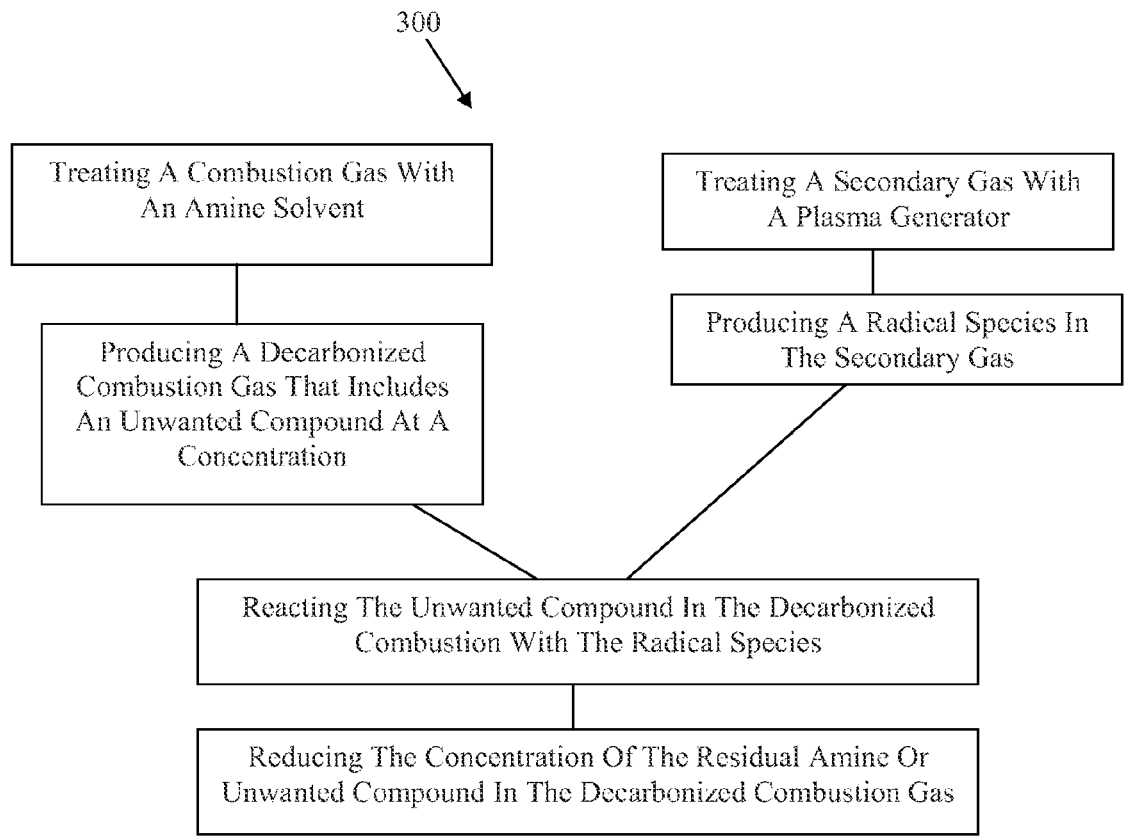
FIG. 3 is a schematic of a method of reducing unwanted carbon capture emissions.

FIG. 3 shows a schematic of a method 300 for reducing carbon capture emissions. Method 300 comprises: (i) treating a combustion gas with an amine solvent to thereby produce a rich amine solvent and a decarbonized combustion gas that includes an unwanted compound at a concentration; (ii) treating at least a portion of a secondary gas with a plasma generator to thereby produce a radical species in the secondary gas; and (iii) reacting the unwanted compound in the decarbonized combustion with the radical species to thereby reduce the concentration of the unwanted compound in the decarbonized combustion gas.

While the figures show NTP generators for producing radical species, it is also contemplated that thermal plasma generators could be used.

The methods and systems described herein provide numerous advantages. Current carbon capture absorbers can be retrofitted with the plasma generators described herein without the need to increase the absorber height. Furthermore, contemplated systems reduce the concentration of unwanted compounds to acceptable levels without introducing signification back pressure. In addition, contemplated systems produce little-to-no $NO_x$.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value filling within the range. Unless otherwise indicated herein, each individual value is incorporated into the specification as if it were individually recited herein. All methods described herein can be performed in any suitable order unless otherwise indicated herein or otherwise dearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for reducing unwanted compounds comprising:
   an absorber comprising a carbon capture unit and a plasma generator;
   wherein the carbon capture unit comprises an amine solvent comprising absorbed carbon dioxide;
   a decarbonized combustion gas comprising an amine, or an amino degradation product, or both disposed in a pathway between the carbon capture unit and the plasma generator;
   wherein the plasma generator is configured (i) to receive the decarbonized combustion gas from the carbon capture unit, and (ii) to produce a plurality of radical species from the plasma generator, and (iii) to contact the plurality of radical species with the decarbonized combustion gas such that at least a portion of the plurality of radical species react with the unwanted compounds to thereby reduce the concentration of the unwanted compounds to a second concentration.

2. The system of claim 1, wherein the plasma generator comprises a non-thermal plasma generator.

3. The system of claim 1, wherein carbon capture unit is configured to receive the stream of amine solvent to thereby produce a rich amine solvent and the decarbonized combustion gas.

4. The system of claim 1, wherein the amine or the amine degradation product is selected from the group consisting of: monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, and nitrosamines.

5. The system of claim 1, wherein the decarbonized combustion gas comprises an amine degradation product.

6. The system of claim 1, wherein a concentration of the amine, the amine degradation product, or both is greater than or equal to fifty parts-per-million, and wherein a second concentration of the amine, the amine degradation product, or both in a gas stream downstream of the plasma generator is less than or equal to 1 part-per-million.

7. The system of claim 1, wherein the plasma generator is configured to produce a pressure drop in the absorber less than or equal to ten millibars.

8. The system of claim 1, wherein the plasma generator is configured to produce a pressure drop in the absorber less than or equal to five millibars.

9. The system of claim 1, wherein the plasma generator is configured to produce less than a 1% increase of $NO_x$ concentration in a gas stream downstream of the plasma generator.

10. A system for reducing unwanted compounds comprising:
    an absorber comprising a carbon capture unit and a plasma generator, wherein the carbon capture unit comprises an amine solvent;
    a combustion gas comprising an amine, or an amine degradation product, or both disposed in a pathway between the carbon capture unit and the plasma generator;
    wherein the plasma generator is configured (i) to receive the combustion as from the carbon capture unit, and (ii) to produce a plurality of radical species from the plasma generator, and (iii) to contact the plurality of radical species with the combustion gas such that at least a portion of the plurality of radical species react with the unwanted compounds to thereby reduce the concentration of the unwanted compounds to a second concentration.

11. The system of claim 10, wherein the plasma generator comprises a non-thermal plasma generator.

12. The system of claim 10, wherein the unwanted compound is selected from the group consisting of monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, and nitrosamines.

13. The system of claim 10, further comprising a downstream combustion gas disposed downstream of the plasma generator, wherein the downstream combustion gas comprises a second concentration of the amine, the amine degradation product, or both that is less than a first concentration of the amine, the amine degradation product, or both in the combustion gas.

14. The system of claim 13, wherein the first concentration is greater than or equal to fifty parts-per-million and the second concentration is less than or equal to 1 part-per-million.

15. The system of claim 13, wherein the plasma generator is configured to produce less than a 1% increase of $NO_x$ concentration in the downstream combustion gas.

16. A system for reducing unwanted emissions from a carbon capture process, comprising:
    a carbon capture absorber having an inlet and an outlet that define a combustion gas pathway, wherein the carbon capture absorber comprises an amine solvent;
    a combustion gas comprising a first concentration of an amine, or an amine degradation product, or both disposed in the combustion gas pathway between a carbon capture unit and a plasma generator;
    the plasma generator disposed in the combustion gas pathway; and a downstream combustion gas comprising a second concentration of an amine, or an amine degradation product, or both disposed in the combustion gas pathway downstream of the plasma generator, wherein the first concentration is greater than the second concentration.

17. The system of claim 16, wherein the carbon capture absorber and the plasma generator are disposed in a single vessel.

18. The system of claim 16, wherein the amine or the amine degradation product are selected from the group consisting of monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, and nitrosamines.

19. The system of claim 16, wherein the first concentration is greater than or equal to fifty parts-per-million.

20. The system of claim 19, wherein the second concentration is less than or equal to 1 part-per-million.

* * * * *

UNITED STATES PATENT AND TRADEMARK OFFICE
CERTIFICATE OF CORRECTION

PATENT NO. : 9,643,125 B2  
APPLICATION NO. : 13/851010  
DATED : May 9, 2017  
INVENTOR(S) : Satish Reddy and Joseph Yonkoski Page 1 of 1

It is certified that error appears in the above-identified patent and that said Letters Patent is hereby corrected as shown below:

On the Title Page

Page (2) item [56], - OTHER PUBLICATIONS Line 4: "Trasnmiattal" should read "Transmittal"

In the Claims

Column 5, Line 40 Claim 1: "amino" should read "amine"

Column 6, Line 25 Claim 10: "as" should read "gas"

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*